United States Patent Office 2,738,367
Patented Mar. 13, 1956

2,738,367
PROCESS FOR THE PRODUCTION OF LEVULINIC ACID

Bryan C. Redmon, Baltimore, Md., assignor to National Distillers Products Corporation, New York, N. Y., a corporation of Virginia No Drawing. Application March 22, 1952, Serial No. 278,137

11 Claims. (Cl. 260—528)

The present invention relates to the manufacture of levulinic acid and provides an improved method whereby levulinic acid of high purity and stability may be readily produced.

According to conventional methods of producing levulinic acid, starch, or the like, is digested with aqueous hydrochloric acid. By this procedure, an exceedingly troublesome amount of an insoluble resin product, known as humin, is formed which greatly complicates the problem of separating the resultant levulinic acid from the reaction mixture. Also, the residues formed are insoluble in practically all of the conventional solvents and, consequently, are very difficult to remove from the reaction vessel.

Extensive effort has been made to overcome the difficulties due to the formation of humin and the low yields of levulinic acid by conventional methods. However, to my knowledge, no method of producing levulinic acid has heretofore been developed in which difficulties, due to the formation of humin, have not been paramount. Aside from decreased yields, the presence of humin in the reaction mixture has interfered with the separation and purification of the resultant levulinic acid and has presented serious filtration difficulty. Technical grade levulinic acid, produced by the conventional methods, just described, has been found to be unstable and to deteriorate in color during normal storage. Also, operations carried on in accordance with conventional practice, have been found to be highly erosive to vitreous linings of reaction vessels and inherently corrosive to metals, even such corrosion-resistant alloys as stainless steel.

These, and other difficulties heretofore experienced in the manufacture of levulinic acid, are avoided by my present process which is predicated upon my discovery that levulinic acid, in increased yields and of improved color stability, may be produced without forming any significant amount of humin, or other insoluble residue, by heating, advantageously with refluxing at atmospheric pressure, while stirring, an aqueous solution of a chemical compound of the group consisting of furfuryl alcohol, fructose, sucrose and glucose, in the presence of a strongly acidic cation exchange resin. Thereafter the ion exchange resin may be removed from the reaction mixture, as by filtration, and the levulinic acid separated from the filtrate by distillation, solvent extraction, or the like, or by a combination of such steps.

The heating period is subject to considerable variation, depending upon the temperature, the particular compound used in the aqueous solution and also, to some extent, upon the characteristics of the cation exchange resin used. Satisfactory results have been obtained using furfuryl alcohol where the heating period, at atmospheric pressure with refluxing, has been as short as one hour, while, in other instances, using glucose, it has been found advantageous to heat the solution, under the same conditions, for a period of about 125 hours. When using sucrose the optimum heating time under similar conditions will usually be about 40 hours and with fructose about 25 hours.

There is available a number of well known cation exchange resins suitable for my purpose. I have, with particular advantage, used a synthetic, high density nuclear sulfonic acid ion exchange resin, marketed under the trade name "Amberlite IR-120." Other cation exchange resins which may be used for this purpose, include, for instance, that marketed under the trade name "Amberlite IR-105."

It is essential that the ion exchange resin, used in accordance with my present process, be acidic. The particular ion exchange resins, just noted, are now usually supplied as the sodium salt which, prior to use, should be treated with a dilute acid, for instance, dilute hydrochloric acid, in the conventional manner, to render them acidic. During use, the resin tends to lose its acidity and should be regenerated from time to time, advantageously before each run, to restore the necessary acidity.

Due to the absence, or substantial absence, of humin from the reaction mixture, the ion exchange resin is readily separated therefrom by ordinary filtration and may readily be regenerated from time to time, as required, by treatment with dilute acid, for instance, dilute hydrochloric acid, by conventional methods.

The filtrate separated from the ion exchange resin is, with advantage, concentrated by a partial distillation, at atmospheric pressure, and the levulinic acid recovered from the concentrated filtrate, by further distillation, at reduced pressure, or by solvent extraction. As the solvent extractant, I have advantageously used ethyl acetate. However, other water-immiscible solvents for levulinic acid may be used, including ethyl ether, chloroform, xylene, propyl acetate, butyl acetate, and the like.

The invention will be further described and illustrated by the following specific examples:

Example I 350 grams of Amberlite IR-120, which, following previous use, had been regenerated by treatment with a 3% aqueous hydrochloric acid solution in the conventional manner, and 1500 mls. of water were heated with refluxing at atmospheric pressure, and 100 grams of furfuryl alcohol was added dropwise, while stirring, over a period of 15 minutes. The heating and stirring were continued for an additional 45 minutes. The resultant mixture was then filtered to effect the separation of the ion exchange resin, the filtrate concentrated by distillation, at atmospheric pressure, and the residue distilled at reduced pressure of 5–6 mm. of mercury absolute to yield 65 grams of levulinic acid, boiling within the range of 127–130° C. at the indicated reduced pressure. There was no apparent formation of humin and the filtration was readily effected. The undistilled residue remaining in the distilling flask was readily, and completely, soluble in acetone and amounted to less than 10 grams. In this operation the proportion of cation exchange resin used was approximately 18% of the total weight of the reaction mixture.

Example II 1,050 grams of the ion exchange resin, such as used in Example I, was added to a solution consisting of 1500 grams of sucrose in 3000 mls. of water. The charge was heated, under atmospheric pressure, with stirring and refluxing, for a period of 41 hours. There was no apparent formation of humin and the ion exchange resin was separated from the reaction mixture by simple filtration. The resultant filtrate was concentrated to approximately 1500 mls. by distillation, at atmospheric pressure, and levulinic acid was extracted from the concentrated filtrate with ethyl acetate. The ethyl acetate extract was then concentrated, by distillation, at atmospheric pressure, and then further distilled at a reduced pressure of 5-6 mm., absolute, to yield 233.5 grams of levulinic acid having a boiling range of 127-130° C., at the subatmospheric pressure just noted. In this operation the proportion of cation exchange resin used was approximately 19% of the total weight of the reaction mixture.

*Example III*

70 grams of the ion exchange resin, used in Example I, was added to a solution of 100 grams of fructose in 200 mls. of water. The mixture was heated with stirring and refluxing, under atmospheric pressure, for a period of 27 hours. There was no apparent formation of humin and the ion exchange resin was separated by simple filtration. The filtrate was then concentrated by distillation, at atmospheric pressure and then distilled at reduced pressure, as described in Example I to yield 23.5 grams of levulinic acid, boiling within the range of 127-130° C., at an absolute pressure of 5-6 mm. of mercury. In this operation the proportion of cation exchange resin used was approximately 19% of the total weight of the reaction mixture.

*Example IV*

A solution of 500 grams of glucose in 1,000 mls. of water was heated with 350 grams of the previously described regenerated Amberlite IR-120 for a period of 124 hours, by the procedure of Example II. There was no separation of humin and 29 grams of levulinic acid was recovered. In using glucose, the reaction was found to be much slower than that of the preceding examples, but, in other respects, the results were similar. In this operation the proportion of cation exchange resin used was approximately 19% of the total weight of the reaction mixture.

The levulinic acid of each of the foregoing examples was found to be color stable under storage conditions and, in this respect, to be markedly superior to levulinic acid produced by conventional methods.

While in the foregoing examples, the heating and refluxing operation has been carried on at atmospheric pressure, it will be understood that somewhat higher, or somewhat reduced pressures may be used providing the temperature of the reaction mixture does not exceed the thermal stability of the ion exchange resin nor fall below that at which the reaction ceases. Usually the temperatures should not exceed about 212° F.

The minimum temperature at which the desired reaction proceeds varies with the particular starting material. Using sucrose, or fructose, the reaction will proceed quite definitely at temperatures as low as 85° C., but much slower than at refluxing temperature under normal pressure conditions. Some reaction is obtainable at temperatures even as low as 65°-70° C. Where glucose is used, a somewhat higher temperature is required for a practical reaction rate. Using furfuryl alcohol, the reaction will proceed at temperatures as low as about 30°-40° C., and appreciable reaction will be obtained at temperatures even as low as room temperature, but, for practical purposes, higher temperatures are desirable in order to accelerate the rate of reaction. These lower reaction temperatures may be used under pressure conditions such that there is little or no vaporization, in which case there will, of course, be no refluxing.

As appears from the foregoing examples, the proportion of cation exchange resin may be varied somewhat but should be of the order of 18-19% of the combined weight of the resin, the water, and the furfuryl alcohol, fructose, sucrose, or glucose constituent.

I claim:

1. A process for producing levulinic acid comprising heating an aqueous solution of a compound selected from the group consisting of furfuryl alcohol, fructose, sucrose and glucose, in the presence of a strongly acidic cation exchange resin, in an amount equal to about 18-19% of the total weight of the reaction mixture, said solution being maintained at an elevated temperature within the range of about 30° to about 100° C. in contact with the resin until a substantial proportion of the selected compound of the group has been converted to levulinic acid.

2. The process of claim 1 in which an aqueous solution of furfuryl alcohol is heated in the presence of the strongly acidic cation exchange resin.

3. The process of claim 1 in which an aqueous solution of sucrose is heated in the presence of the strongly acidic cation exchange resin to a temperature in excess of about 85° C.

4. The process of claim 1 in which an aqueous solution of fructose is heated in the presence of the strongly acidic cation exchange resin to a temperature in excess of about 85° C.

5. The process of claim 1 in which the aqueous solution is heated with refluxing under atmospheric pressure.

6. The process of claim 1 in which the ion exchange resin is thereafter separated from the reaction mixture and the levulinic acid separated from the solution by distillation.

7. The process of claim 1 in which the ion exchange resin is separated from the reaction mixture, the separated solution concentrated by partial distillation and the levulinic acid separated from the concentrated solution by solvent extraction.

8. The process of claim 5 in which an aqueous solution of furfuryl alcohol is heated for a period of about one hour.

9. The process of claim 5 in which an aqueous solution of sucrose is heated for a period of about 41 hours.

10. The process of claim 5 in which an aqueous solution of fructose is heated for a period of about 27 hours.

11. The process of claim 5 in which an aqueous solution of glucose is heated for a period of about 125 hours.

References Cited in the file of this patent

UNITED STATES PATENTS

| | | |
|---|---|---|
| 2,257,389 | Macallum | Sept. 30, 1941 |
| 2,270,328 | Moyer | Jan. 20, 1942 |
| 2,382,572 | Meyer | Aug. 14, 1945 |

OTHER REFERENCES

Nachod: "Ion Exchange" (Academic Press), pgs. 265-72 (1949).

Hachihama et al.: Chem. Abstracts, vol. 44, 8859 (1950).

Kunin et al.: "Ion Exchange Resins" (Wiley), pgs. 137-140 (1950).